United States Patent
Ruth et al.

(10) Patent No.: US 7,543,446 B2
(45) Date of Patent: Jun. 9, 2009

(54) SYSTEM FOR CONTROLLING REGENERATION OF EXHAUST GAS AFTERTREATMENT COMPONENTS

(75) Inventors: Michael J. Ruth, Franklin, IN (US); Stewart D. Sullivan, Columbus, IN (US); Lyle E. Kocher, Franklin, IN (US); Michael J. Cunningham, Greenwood, IN (US); Neal W. Currier, Columbus, IN (US); James J. Fier, Columbus, IN (US); Samuel C. Geckler, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 11/957,872

(22) Filed: Dec. 17, 2007

(65) Prior Publication Data

US 2008/0173011 A1 Jul. 24, 2008

Related U.S. Application Data (60) Provisional application No. 60/871,053, filed on Dec. 20, 2006.

(51) Int. Cl.
*F01N 3/00* (2006.01)
(52) U.S. Cl. .................. 60/295; 60/274; 60/286; 60/297; 60/303
(58) Field of Classification Search .............. 60/274, 60/285, 295, 297, 303, 311
See application file for complete search history.

(56) References Cited

U.S. PATENT DOCUMENTS 5,974,791 A * 11/1999 Hirota et al. ............... 60/276
6,032,461 A * 3/2000 Kinugasa et al. ............... 60/295
6,813,882 B2 * 11/2004 Hepburn et al. ............... 60/286
6,820,418 B2 * 11/2004 Nakatani et al. ............... 60/297
6,931,842 B2 8/2005 Ohtake et al.
6,973,778 B2 12/2005 Kondou et al.
6,978,604 B2 12/2005 Wang et al.
6,990,803 B2 1/2006 Koga et al.
7,028,466 B2 4/2006 Kondou et al.
7,062,907 B2 * 6/2006 Kitahara ...................... 60/295
7,159,392 B2 * 1/2007 Kondoh et al. ................ 60/297
2004/0123590 A1 * 7/2004 Tabata et al. .................. 60/295
2004/0144087 A1 * 7/2004 Kondou et al. ................ 60/295
2005/0056005 A1 * 3/2005 Otake et al. ................... 60/295

FOREIGN PATENT DOCUMENTS

EP 1541828 6/2005

\* cited by examiner

*Primary Examiner*—Tu M Nguyen
(74) *Attorney, Agent, or Firm*—Barnes & Thornburg LLP; J. Bruce Schelkopf (57) ABSTRACT

A system and method are provided for controlling regeneration of exhaust gas aftertreatment components coupled to an internal combustion engine. For example, the particulate load of a particulate filter is monitored and a road speed of the vehicle is determined. If the particulate load is greater than a particulate load threshold and the road speed is greater than a road speed threshold, regeneration of the particulate filter is initiated. As another example, the sulfur oxide load (SOx) of a NOx catalyst is also monitored, and if the SOx load is greater than a SOx threshold while the particulate filter is being regenerated, regeneration of the particulate filter is terminated and SOx regeneration of the NOx catalyst is initiated.

23 Claims, 3 Drawing Sheets

SYSTEM FOR CONTROLLING REGENERATION OF EXHAUST GAS AFTERTREATMENT COMPONENTS

CROSS-REFERENCE TO RELATED APPLICATION

This application claims the benefit of, and priority to, U.S. Provisional Patent Application Ser. No. 60/871,053, filed Dec. 20, 2006, the disclosure of which is incorporated herein by reference.

FIELD OF THE INVENTION

The present invention relates generally to exhaust gas aftertreatment systems, and more specifically to techniques for controlling regeneration of exhaust gas aftertreatment components.

BACKGROUND

It is generally known that exhaust gas aftertreatment components, such as particulate (soot) filters and NOx adsorber catalysts, may sometimes require active regeneration to reduce the amounts of exhaust gas components collected therein. It is desirable to control active regeneration of such aftertreatment components in a manner that results in less time spent in non-productive engine operating conditions to complete the regeneration events.

SUMMARY

The present invention may comprise one or more of the features recited in the attached claims, and/or one or more of the following features and combinations thereof. A system for controlling regeneration of exhaust gas aftertreatment components fluidly coupled to an exhaust manifold of an internal combustion engine may comprise a particulate filter defining one of the exhaust gas aftertreatment components, a vehicle speed sensor producing a vehicle speed signal indicative of road speed of a vehicle carrying the engine and the exhaust gas treatment device, and a control circuit. The control circuit may include a memory unit having stored therein instructions that are executable by the control circuit to monitor a particulate load of the particulate filter and initiate regeneration of the particulate filter if the particulate load is greater than a first load threshold and the vehicle speed signal indicates that the road speed of the vehicle is greater than a first speed threshold.

The instructions may further comprise instructions that are executable by the control circuit to initiate regeneration of the particulate filter regardless of the road speed of the vehicle if the particulate load is greater than a regeneration threshold. The regeneration threshold may be greater than the first load threshold.

The system may further comprise an engine speed sensor producing an engine speed signal indicative of rotational speed of the engine. The instructions may further comprise instructions that are executable by the control circuit to determine the particulate load based on the engine speed signal. The system may further comprise a fuel system responsive to a fueling signal to supply fuel to the engine. The instructions may further comprise instructions that are executable by the control circuit to determine the particulate load further based on the fueling signal. The instructions may further comprise instructions that are executable by the control circuit to determine instantaneous values of the particulate load as a function of corresponding instantaneous values of the engine speed signal and the fueling signal while the particulate filter is not being regenerated, and to determine the particulate load by accumulating the instantaneous values of the particulate load over time. The system may further comprise an oxidation rate function stored in the memory unit. The oxidation rate function may define a rate of oxidation of particulates in the particulate filter as a function of time. The instructions may further comprise instructions that are executable by the control circuit to reduce the particulate load based on the oxidation rate function over a period of time during which the particulate filter is being regenerated.

The system may further comprise a NOx catalyst defining another of the exhaust gas aftertreatment components. The instructions may further comprise instructions that are executed by the control circuit to monitor a sulfur oxide (SOx) load of the NOx catalyst and initiate SOx regeneration of the NOx catalyst if the particulate filter is being regenerated and the SOx load is greater than a first SOx load threshold. The system may further comprise a fuel system responsive to a fueling signal to supply fuel to the engine. The instructions may further comprise instructions that are executable by the control circuit to determine the SOx load of the NOx catalyst based on the fueling signal. The instructions may further comprise instructions that are executable by the control circuit to determine instantaneous values of the SOx load of the NOx catalyst as a function of corresponding instantaneous values of the fueling signal while the NOx catalyst is not undergoing SOx regeneration, and to determine the SOx load by accumulating the instantaneous values of the SOx load over time. The system may further comprise an oxidation rate function stored in the memory unit. The oxidation rate function may define a rate of oxidation of SOx in the NOx catalyst as a function of time. The instructions may further comprise instructions that are executable by the control circuit to reduce the SOx load based on the oxidation rate function over a period of time during which the NOx catalyst is undergoing SOx regeneration.

The instructions may further comprise instructions that are executed by the control circuit to terminate regeneration of the particulate filter prior to initiating SOx regeneration of the NOx catalyst. The instructions may further comprise instructions that are executed by the control circuit to command SOx regeneration of the NOx catalyst while the vehicle speed signal indicates that the road speed of the vehicle is above a second speed threshold that is less than the first speed threshold. The instructions may further comprise instructions that are executed by the control circuit to terminate SOx regeneration of the NOx catalyst if the SOx load drops below a second SOx load threshold that is less than the first SOx load threshold. The instructions may further comprise instructions that are executed by the control circuit to terminate SOx regeneration of the NOx catalyst if the road speed of the vehicle drops below the second speed threshold.

The instructions may further comprise instructions that are executed by the control circuit to command regeneration of the particulate filter while the particulate load is above a second load threshold that is less than the first particulate load threshold if the SOx load is less than the first SOx load threshold. The instructions may further comprise instructions that are executed by the control circuit to terminate regeneration of the particulate filter if the particulate load drops below the second load threshold.

The NOx catalyst may be positioned between the exhaust manifold of the engine and the particulate filter. The system may further comprise an oxidation catalyst positioned between the exhaust manifold of the engine and the particulate filter and NOx catalyst. The control circuit may be configured to control regeneration of the particulate filter by controlling delivery of fuel from the fuel system to the engine so that unburned fuel is introduced into exhaust gas produced by the engine, whereby the unburned fuel in the exhaust gas reacts with the oxidation catalyst to elevate the temperature of exhaust gas passing through the particulate filter to a temperature suitable for oxidizing particulate matter collected in the particulate filter. The control circuit may further be configured to control SOx regeneration of the NOx catalyst by likewise controlling delivery of fuel from the fuel system to the engine so that unburned fuel is introduced into exhaust gas produced by the engine, whereby the unburned fuel in the exhaust gas reacts with the oxidation catalyst to elevate the temperature of exhaust gas passing through the NOx catalyst to a temperature suitable for oxidizing SOx collected in the NOx catalyst.

A method of controlling regeneration of exhaust gas aftertreatment components coupled to an exhaust manifold of an internal combustion engine may comprise monitoring a particulate load of a particulate filter comprising one of the exhaust gas aftertreatment components, determining a vehicle speed corresponding to a road speed of a vehicle carrying the engine and the exhaust gas aftertreatment components, and initiating regeneration of the particulate filter if the particulate load is greater than a first particulate load threshold and the road speed is greater than a first speed threshold.

The method may further comprise monitoring a sulfur oxide (SOx) load of a NOx catalyst comprising another of the exhaust gas aftertreatment components, and terminating regeneration of the particulate filter and initiating SOx regeneration of the NOx catalyst if the particulate filter is being regenerated and the SOx load is greater than a first SOx load threshold. The method may further comprise commanding SOx regeneration of the NOx catalyst while the road speed of the vehicle is greater than the first speed threshold, and terminating SOx regeneration of the NOx catalyst if the SOx load of the NOx catalyst drops below a second SOx load threshold that is less than the first SOx load threshold. The method may further comprise terminating SOx regeneration of the NOx catalyst if the road speed drops below a second speed threshold that is lower than the first speed threshold.

The method may further comprise commanding regeneration of the particulate filter if the SOx load of the NOx catalyst is less than the first SOx threshold, and terminating regeneration of the particulate filter when the particulate load drops below a second particulate load threshold that is less than the first particulate load threshold.

Monitoring the particulate load may further comprise determining rotational speed of the engine, determining a rate of fuel supplied to the engine, and determining the particulate load as a function of the rotational speed of the engine and the rate of fuel supplied to the engine when the particulate filter is not being regenerated. Determining the particulate load may further comprise determining an instantaneous particulate load as a function of instantaneous values of the rotational speed of the engine and the rate of fuel supplied to the engine when the particulate filter is not being regenerated, and determining the particulate load by accumulating values of the instantaneous particulate load over time. Determining the particulate load may further comprise determining an oxidation rate of particulates in the particulate filter as a function of time, and reducing the particulate load as a function of the oxidation rate and a time period corresponding to the duration of regeneration of the particulate filter. Determining an oxidation rate of particulates in the particulate filter over time may comprise recalling from a memory unit the oxidation rate previously stored therein.

Monitoring the SOx load of the NOx catalyst may comprise determining a rate of fuel supplied to the engine, and determining the SOx load as a function of the rotational speed of the engine when the NOx catalyst is not undergoing SOx regeneration. Determining the SOx load of the NOx catalyst may further comprise determining an instantaneous SOx load as a function of an instantaneous value of the rate of fuel supplied to the engine when the NOx catalyst is not undergoing SOx regeneration, and determining the SOx load by accumulating values of the instantaneous SOx load over time. Determining the SOx load of the NOx catalyst may further comprise determining an oxidation rate of SOx in the NOx catalyst as a function of time, and reducing the SOx load as a function of the oxidation rate and a time period corresponding to the duration of SOx regeneration of the NOx catalyst. Determining an oxidation rate of SOx in the NOx catalyst as a function of time may comprise recalling from a memory unit the oxidation rate previously stored therein.

The method may further comprise initiating regeneration of the particulate filter regardless of the road speed of the vehicle if the particulate load is above a regeneration load threshold that is higher than the first particulate load threshold.

Initiating regeneration of the particulate filter may comprise controlling delivery of fuel to the engine so that unburned fuel is selectively introduced into exhaust gas produced by the engine, whereby the unburned fuel in the exhaust gas reacts with an oxidation catalyst positioned between the exhaust manifold and the particulate filter to elevate the temperature of exhaust gas passing through the particulate filter to a temperature suitable for oxidizing particulate matter collected in the particulate filter.

Initiating SOx regeneration of the NOx catalyst may comprise controlling delivery of fuel to the engine so that unburned fuel is selectively introduced into exhaust gas produced by the engine, whereby the unburned fuel in the exhaust gas reacts with an oxidation catalyst positioned between the exhaust manifold and the NOx catalyst to elevate the temperature of exhaust gas passing through the NOx catalyst to a temperature suitable for oxidizing SOx collected in the NOx catalyst.

A method of regenerating a particulate filter and a NOx catalyst that are fluidly coupled to an exhaust manifold of an internal combustion engine may comprise monitoring a particulate load of the particulate filter, monitoring a sulfur oxide (SOx) load of the NOx catalyst, determining a road speed of a vehicle carrying the engine, the particulate filer and the NOx catalyst, initiating regeneration of the particulate filter if the particulate load is greater than a first particulate load threshold and the road speed is greater than a road speed threshold, and terminating regeneration of the particulate filter and initiating SOx regeneration of the NOx catalyst if the particulate filter is being regenerated and the SOx load is greater than a first SOx load threshold.

The method may further comprise commanding regeneration of the particulate filter while the particulate load is greater than a second particulate load threshold that is less than the first particulate load threshold if the SOx load of the NOx catalyst is less than the first SOx load threshold, and terminating regeneration of the particulate filter when the particulate load drops below the second particulate load threshold.

The method may further comprise commanding SOx regeneration of the NOx catalyst while the road speed is greater than a second road speed threshold that is less than the first road speed threshold and the SOx load is greater than a second SOx load threshold that is less than the first SOx load threshold, and terminating the SOx regeneration of the NOx catalyst when the SOx load drops below the second SOx load threshold.

The method may further comprise terminating the SOx regeneration of the NOx catalyst is the road speed drops below the second road speed threshold.

Initiating regeneration of the particulate filter may comprise controlling delivery of fuel to the engine so that unburned fuel is selectively introduced into exhaust gas produced by the engine, whereby the unburned fuel in the exhaust gas reacts with an oxidation catalyst positioned between the exhaust manifold and the particulate filter to elevate the temperature of exhaust gas passing through the particulate filter to a temperature suitable for oxidizing particulate matter collected in the particulate filter.

Initiating SOx regeneration of the NOx catalyst may comprise controlling delivery of fuel to the engine so that unburned fuel is selectively introduced into exhaust gas produced by the engine, whereby the unburned fuel in the exhaust gas reacts with an oxidation catalyst positioned between the exhaust manifold and the NOx catalyst to elevate the temperature of exhaust gas passing through the NOx catalyst to a temperature suitable for oxidizing SOx collected in the NOx catalyst.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
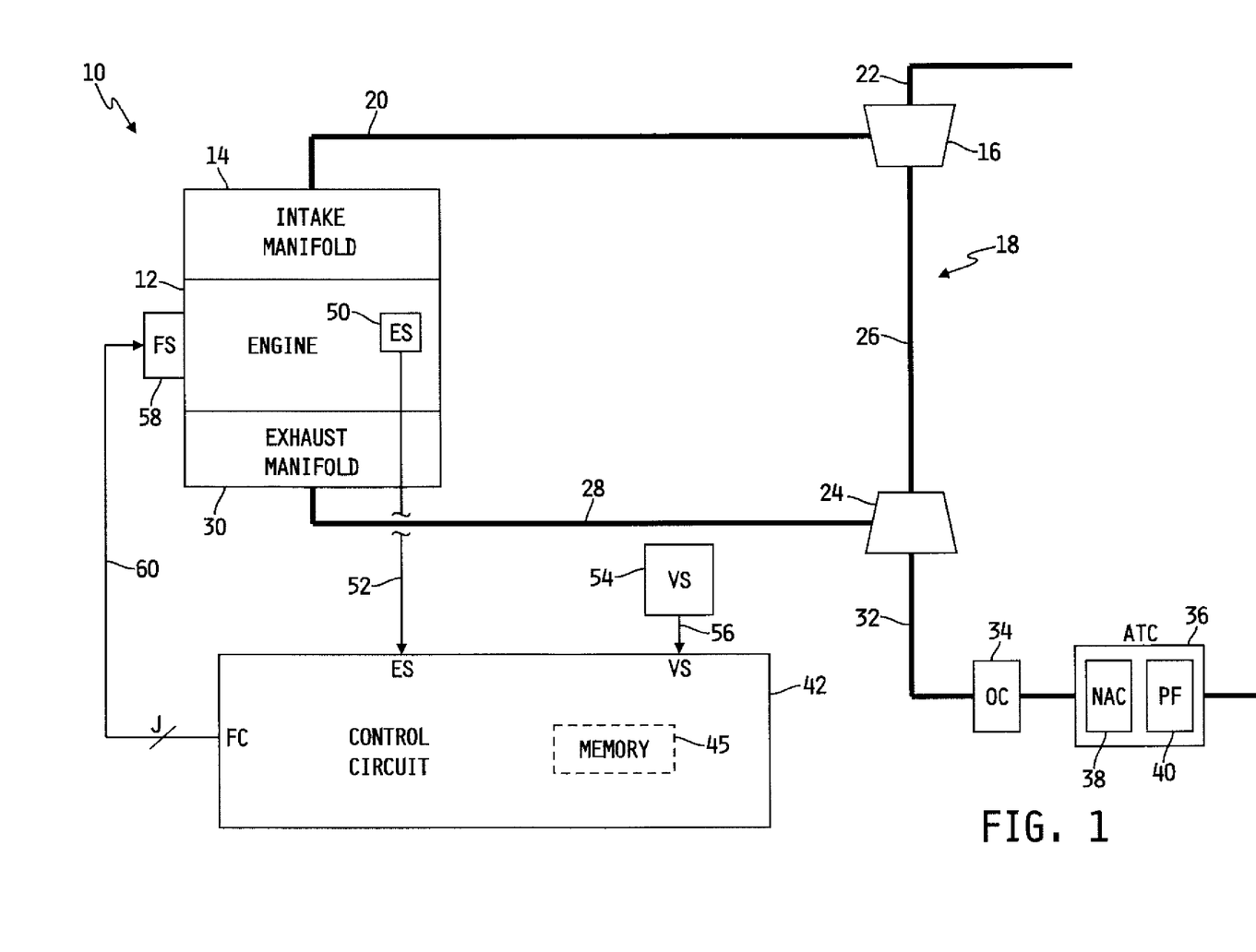
FIG. 1 is a diagram of one illustrative embodiment of a system for controlling regeneration of exhaust gas aftertreatment components.

Referring now to FIG. 1, one illustrative embodiment of a system 10 for controlling regeneration of exhaust gas aftertreatment components is shown. In the illustrated embodiment, the system 10 includes an internal combustion engine 12 having an intake manifold 14 fluidly coupled to a fresh air outlet of a compressor 16 of a turbocharger 18 via conduit 20. A fresh air inlet of the compressor 16 is fluidly coupled to a fresh air intake conduit 22. A turbine 24 of the turbocharger 18 is mechanically coupled via a rotational drive shaft 26 to the compressor 16 in a conventional manner. An exhaust gas inlet of the turbine 24 is fluidly coupled to an exhaust manifold 30 of the engine 12 via an exhaust gas conduit 28. An exhaust gas outlet of the turbine 24 is fluidly coupled to an exhaust gas inlet of an oxidation catalyst (OC) 34 via an exhaust gas conduit 32. The oxidation catalyst 34 includes a conventional catalyst element that reacts with hydrocarbons introduced into the exhaust gas stream to elevate the temperature of the exhaust gas to a temperature suitable for regeneration of one or more downstream exhaust gas aftertreatment components. An example of one such aftertreatment component 36 is illustrated in FIG. 1, and is disposed in-line with the exhaust gas conduit 32 between the OC 34 and ambient. In the illustrated embodiment, the exhaust gas aftertreatment component (ATC) 36 includes a conventional NOx adsorber catalyst (NAC) 38 followed by a downstream conventional particulate filter (PF) 40. For purposes of this document, the exhaust aftertreatment component 36 may include more component elements in any desired order relative to the direction of exhaust gas flow.

The system 10 further includes a control circuit 42 configured to control the overall operation of the engine 12. In one embodiment, the control circuit 42 is a microprocessor-based control circuit typically referred to as an electronic or engine control module (ECM), or electronic or engine control unit (ECU). It will be understood, however, that the control circuit 42 may generally be or include one or more general purpose or application specific control circuits arranged and operable as will be described hereinafter. The control circuit 42 includes, or is coupled to, a memory unit 45 that stores therein a number of software algorithms executable by the control circuit 42 to control various operations of the engine 12.

The system 10 includes a number of inputs and outputs configured to receive sensory data corresponding to one or more operating parameters of the engine 12 and to control operation of one or more actuators or engine systems. For example, the system 10 includes an engine speed sensor 50 electrically connected to an engine speed input (ES) of the control circuit 42 via a signal path 52. In one embodiment, the engine speed sensor 50 is a conventional Hall-effect sensor producing a signal on the signal path 52 that is indicative of engine speed and crank angle relative to a reference crank angle; e.g., top-dead-center (TDC). Alternatively, any conventional sensor may be used; e.g., variable reluctance sensor or the like, that is configured to produce a signal on signal path 52 that is indicative of the rotational speed of the engine 12.

The system 10 further includes a vehicle speed sensor 54 electrically connected to a vehicle speed input (VS) of the control circuit 42 via a signal path 56. In one embodiment, the vehicle speed sensor 54 is a conventional variable reluctance sensor producing a signal on the signal path 56 that is indicative of vehicle road speed. Alternatively, any conventional sensor may be used and suitably positioned relative to a vehicle carrying the engine 12 to produce a signal indicative of vehicle road speed.

A conventional fuel system 58 is coupled to the engine 12, and is electrically connected to the control circuit 42 by a number, J, of signal paths 60, wherein J may be any positive integer. The control circuit 42 includes conventional fueling logic which is responsive to a number of engine operating conditions, such as engine speed and other operating conditions, to determine appropriate fueling commands in a conventional manner. The control circuit 42 provides the fueling commands (FC) to the fuel system 58 via the one or more signal paths 60 to thereby control the fuel system 58 in a conventional manner to supply fuel to the engine 12.

Figure 2A:
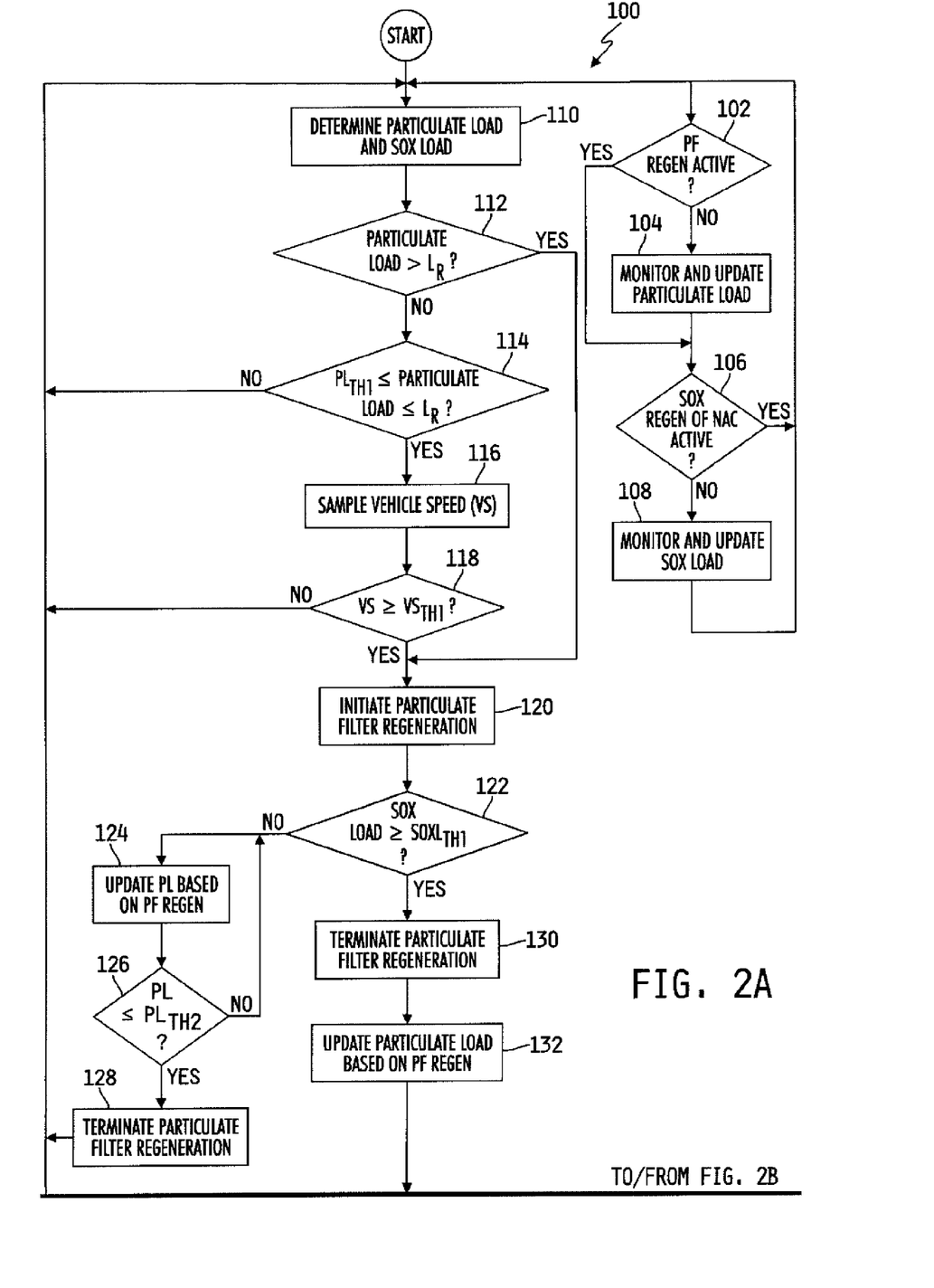
FIGS. 2A and 2B show a flowchart of one illustrative embodiment of a software algorithm that is executable by the system of FIG. 1 to control regeneration of exhaust gas aftertreatment components.
Figure 2B:
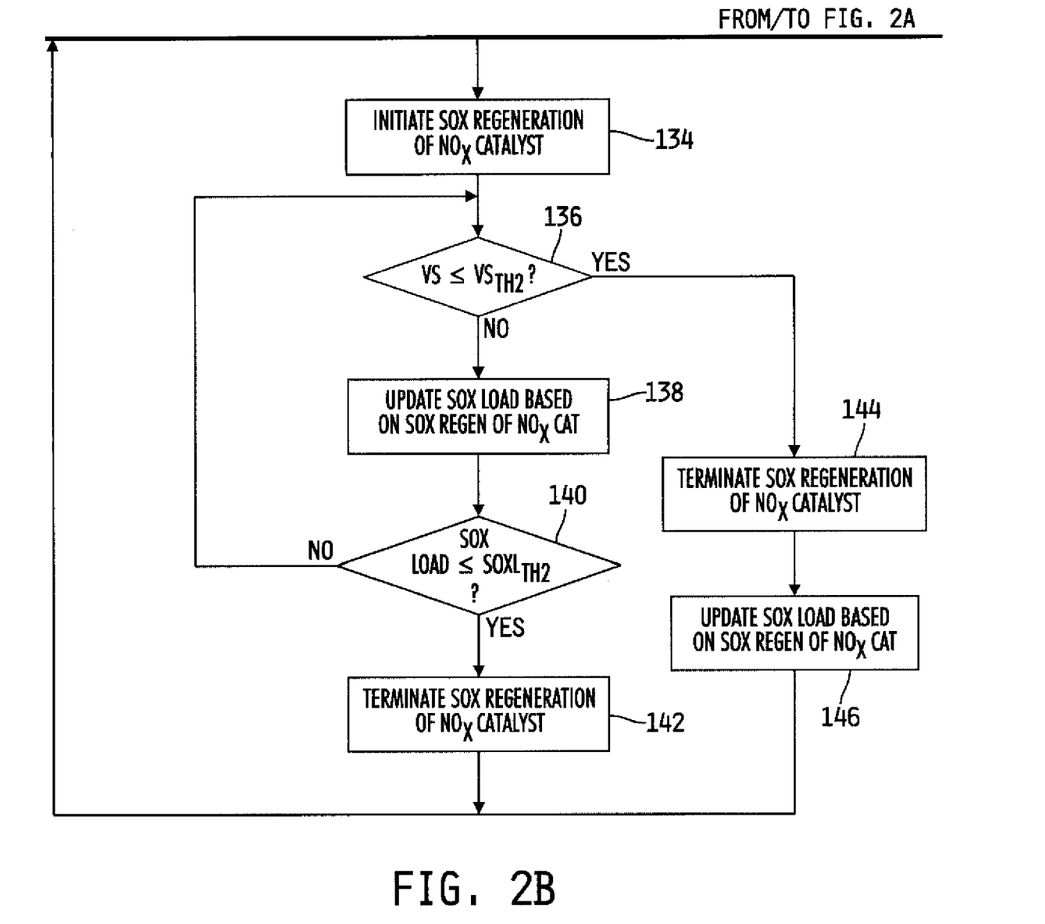

Referring now to FIGS. 2A and 2B, a flowchart is shown of one illustrative embodiment of a software algorithm 100 for controlling regeneration of exhaust gas aftertreatment components. The software algorithm 100 can be stored in the memory unit 45 in the form of instructions that are executable by the control circuit 42 to control regeneration of exhaust gas aftertreatment components. The algorithm begins, in one branch thereof, at step 102 where the control circuit 42 is operable to determine whether active regeneration of the particulate filter 40 is in progress. The memory unit 45 has one or more conventional particulate filter regeneration software algorithms stored therein that are executable by the control circuit 42 to actively or controllably regenerate the particulate filter 40 in a known manner under specified operating conditions. In one embodiment, for example, the control circuit 42 may be operable under the direction of such one or more particulate filter regeneration software algorithms to actively or controllably regenerate the particulate filter 40 by controlling the fuel system 58 in a conventional manner to introduce hydrocarbons in the form of unburned fuel into the exhaust gas produced by the engine 12, e.g., according to a conventional post-injection fuel control strategy. The injected hydrocarbons react with the oxidation catalyst according to a known exothermic reaction that causes the oxidation catalyst to heat the exhaust gas provided to the particulate filter to a particulate filter regeneration temperature range suitable to regenerate the particulate filter 40 by burning the particulates, or soot, trapped therein.

The control circuit 42 is operable, under the direction of the one or more particulate filter regeneration software algorithms, to control the fuel system 58 in the manner just described to maintain the temperature of the exhaust gas provided to the particulate filter in the particulate filter regeneration range for a time period necessary to satisfactorily regenerate the particulate filter. It will be understood that active or controlled regeneration of the particulate filter 40 should not be limited to the example active regeneration process just described. Those skilled in the art will recognize other conventional structures and processes for actively or controllably regenerate the particulate filter, in particular alternate structures, processes and/or hydrocarbons sources for introducing hydrocarbons into the exhaust gas supplied to the particulate filer, and any such other conventional structures, processes and/or hydrocarbon sources are contemplated by this disclosure.

In any case, the control circuit 42 is generally operable to maintain a particulate filter regeneration value that is indicative of whether or not the particulate filter 40 is being actively or controllably regenerated. For example, the control circuit 42 may be operable to set the particulate filter regeneration value to a "1" or "true" if the particulate filter 40 is being actively regenerated, and is otherwise a "0" or "false." In this example, the control circuit 42 is operable at step 102 to determine whether active regeneration of the particulate filter 40 is in progress by monitoring the state or status of the particulate regeneration value. It will be understood that determining whether the particulate filter 40 is being actively regenerated should not be limited to the example just provided. Those skilled in the art will recognize other processes for determining whether the particulate filter 40 is being actively regenerated, and any such other processes are contemplated by this disclosure.

If, at step 102, the control circuit 42 determines that the particulate filter 40 is not being actively regenerated, algorithm execution advances to step 104 where the control circuit 42 is operable to monitor the particulate load of the particulate filter 40 and to update a particulate load accumulator in the memory unit 45. In one embodiment, the control circuit 42 is operable at step 104 to monitor the particulate load of the particulate filter as a conventional function of instantaneous engine fueling rate and instantaneous engine speed. The memory unit 45 may, for example, have a 2-dimensional particulate load monitoring table stored therein having one table axis defined by discrete values of engine fueling rate and another table axis defined by discrete values of engine speed, and which is populated by incremental particulate load values. In this embodiment, the control circuit 42 is operable at step 104 to determine the instantaneous engine fueling rate by monitoring the fuel command signals produced on the signal path 60, determine the instantaneous engine speed by monitoring the engine speed signal on the signal path 52, and to map these instantaneous fueling and engine speed values to a corresponding incremental particulate load value using the particulate load monitoring table just described. The control circuit 42 may then be operable to update the particulate load accumulator by adding the incremental particulate load value to the current particulate load value of the particulate load accumulator. Those skilled in the art will recognize other conventional structures and/or techniques for monitoring and tracking the particulate or soot load of the particulate filter 40, and such other conventional structures and/or techniques are contemplated by this disclosure.

Following step 104, and also following the "YES" branch of step 102, execution of the algorithm 100 advances to step 106 where the control circuit 42 is operable to determine whether active SOx (Sulfur oxides) regeneration (also known as a de-SOx event) of the NOx adsorber catalyst (NAC) is in progress. The memory unit 45 has one or more conventional SOx regeneration or de-SOx software algorithms stored therein that are executable by the control circuit 42 to actively or controllably regenerate the NAC 38 to purge the NAC 38 of SOx in a known manner under specified operating conditions. In one embodiment, for example, the control circuit 42 may be operable under the direction of such one or more SOx regeneration software algorithms to actively or controllably regenerate the NAC 38 by controlling the fuel system 58 in a conventional manner to introduce hydrocarbons in the form of unburned fuel into the exhaust gas produced by the engine 12 as described above. Sufficient hydrocarbons are introduced into the exhaust gas stream to react with the oxidation catalyst so that the oxidation catalyst heats the exhaust gas provided to the NAC 38 to a SOx regeneration temperature range suitable to regenerate the NAC 38 by oxidizing the SOx trapped in the NAC 38.

The control circuit 42 is operable, under the direction of the one or more SOx regeneration software algorithms, to control the fuel system 58 in the manner just described to maintain the temperature of the exhaust gas provided to the NAC 38 in the SOx regeneration temperature range for a time period necessary to satisfactorily oxidize the SOx trapped in the NAC 38. It will be understood that active or controlled SOx regeneration or de-SOx of the NAC 38 should not be limited to the example process just described. Those skilled in the art will recognize other conventional structures and processes for actively or controllably conducting SOx regeneration of the NAC 38, in particular alternate structures, processes and/or hydrocarbons sources for introducing hydrocarbons into the exhaust gas supplied to the NAC 38, and any such other conventional structures, processes and/or hydrocarbon sources are contemplated by this disclosure.

The control circuit 42 is generally operable to maintain a SOx regeneration value that is indicative of whether or not active SOx regeneration of the NAC 38 is being carried out. For example, the control circuit 42 may be operable to set the SOx regeneration value to a "1" or "true" if the NAC 38 being actively SOx regenerated, and is otherwise a "0" or "false." In this example, the control circuit 42 is operable at step 106 to determine whether active SOx regeneration of the NAC 38 is in progress by monitoring the state or status of the SOx regeneration value. It will be understood that determining whether the NAC 38 is being actively SOx regenerated should not be limited to the example just provided. Those skilled in the art will recognize other processes for determining whether the NAC 38 is being actively SOx regenerated, and any such other processes are contemplated by this disclosure.

If, at step 106, the control circuit 42 determines that active SOx regeneration of the NAC 38 is not occurring, algorithm execution advances to step 108 where the control circuit 42 is operable to monitor the SOx load of the NAC 38 and to update a SOx load accumulator in the memory unit 45. In one embodiment, the control circuit 42 is operable at step 108 to monitor the SOx load of the NAC 38 as a conventional function of instantaneous engine fueling rate. The memory unit 45 may, for example, have a one-dimensional SOx load monitoring array stored therein having an axis defined by discrete values of engine fueling rate, and which is populated by incremental SOx load values. In this embodiment, the control circuit 42 is operable at step 108 to determine the instantaneous engine fueling rate by monitoring the fuel command signals produced on the signal path 60, and to map the instantaneous fueling rate value to a corresponding incremental SOx load value using the SOx load monitoring array just described. The control circuit 42 may then be operable to update the SOx load accumulator by adding the incremental SOx load value to the current SOx load value of the SOx load accumulator. Those skilled in the art will recognize other conventional structures and/or techniques for monitoring and tracking the SOx load of the NAC 38, and such other conventional structures and/or techniques are contemplated by this disclosure.

In any case, execution of the algorithm 100 loops from step 108, and also from the "YES" branch of step 106, back to step 102 so that the particulate load and SOx load monitors are continuously operating whenever the particulate filter 40 is not being actively regenerated and the NAC 38 is not undergoing SOx regeneration. In one particular embodiment, active regeneration of the particulate filter 40 will generally be necessary every several hours, e.g., 25, of engine operation, and active SOx regeneration of the NAC 38 will generally be necessary every several gallons, e.g., 75, of fuel used by the engine 12. It will be understood, however, that other active regeneration frequencies for either or both of SOx regeneration of the NAC 38 and regeneration of the particulate filter 40 may alternatively be used.

The algorithm loop containing steps 102-108 monitors the particulate load of the particulate filter 40 and the SOx load of the NAC 38 whenever active regeneration of either exhaust gas aftertreatment component is not in progress. The algorithm 100 includes another loop that controls active regeneration of the particulate filter 40 and active SOx regeneration of the NAC 36, and that loop comprises steps 110-142 of the algorithm 100. Generally, the two loops of the algorithm 100 are executed continuously and simultaneously, or at least in time-shared fashion. The active regeneration control loop begins at step 110 where the control circuit 42 is operable to determine the particulate load of the particulate filter 40 and the SOx load of the NAC 38. In the illustrated embodiment, the control circuit 42 is operable at step 110 to determine the particulate load of the particulate filter 40 and the SOx load of the NAC 38 by monitoring the current values of the particulate load accumulator and the SOx load accumulator respectively in the memory unit 45. Alternatively, the control circuit 42 may be operable at step 110 to determine the particulate load of the particulate filter 40 and/or the SOx load of the NAC 38 according to one or more other conventional techniques. Following step 110, the control circuit 42 is operable at step 112 to determine whether the particulate load determined at step 110 is greater than a regeneration or particulate load threshold, $L_R$. In the illustrated embodiment, the particulate load threshold, $L_R$, corresponds to a particulate content of the particulate filter 40 that is sufficiently high to warrant immediate regeneration of the particulate filter 40. If the control circuit 42 determines at step 112 that the particulate load is greater than $L_R$, algorithm execution advances to step 120. Otherwise, algorithm execution advances to step 114.

At step 114, the control circuit 42 is operable to determine whether the particulate load determined at step 110 is within a range of particulate load values defined by the particulate load threshold, $L_R$, and a lower a particulate load threshold value, $PL_{TH1}$, according to the relationship $PL_{TH1} \leq$ particulate load $< L_R$ ($PL_{TH1} < L_R$). If not, this indicates that the particulate load of the particulate filter 40 is sufficiently low that regeneration of the particulate filter 40 is not warranted. If, at step 114 the control circuit 42 instead determines that the particulate load of the particulate filter is within the range defined by $L_R$ and $PL_{TH1}$, algorithm execution advances to step 116 where the control circuit 42 is operable to determine the current road speed of the vehicle carrying the engine 12. In the illustrated embodiment, the control circuit 42 is operable to determine the current road speed of the vehicle carrying the engine 12 by sampling the vehicle speed signal, VS, produced by the vehicle speed sensor 54. Those skilled in the art will recognize other conventional structures and/or techniques for determining the road speed of the vehicle carrying the engine 12, and any such other conventional structures and/or techniques are contemplated by this disclosure.

Following step 116, the control circuit 12 is operable at step 118 to determine whether the road speed, VS, exceeds a threshold road speed, $VS_{TH1}$. In one exemplary embodiment, $VS_{TH1}$ is 35 miles per hour, although other vehicle speed threshold values may be used. Additionally, step 118 may include a time component, e.g., $VS \geq VS_{TH1}$ for more than a predefined time period. One example predefined time period may be approximately 25 seconds, although other predefined time periods are contemplated by this disclosure. Additionally or alternatively, step 118 may include a conventional cruise switch component, e.g., $VS \geq VS_{TH1}$ for more than a predefined time period or $VS \geq VS_{TH1}$ and the cruise switch is set. In any case, the control circuit 42 is operable at step 118 to advance to step 120 if $VS \geq VS_{TH1}$, $VS \geq VS_{TH1}$ for more than a predefined time period or $VS \geq VS_{TH1}$ and the cruise switch is set. Otherwise, execution of the algorithm loops back to step 110.

At step 120 the control circuit 42 is operable to initiate regeneration of the particulate filter 40 in a conventional manner as described hereinabove. Thereafter at step 122, the control circuit 42 is operable to determine whether the SOx load of the NAC 38 that was determined at step 110 exceeds a SOx load threshold, $SOXL_{TH1}$. Generally, $SOXL_{TH1}$ corresponds to a SOx load at and above which it is desirable to conduct SOx regeneration of the NAC 38. If, at step 122, the control circuit 42 determines that the SOx load of the NAC 38 is less than the SOx load threshold, $SOXL_{TH1}$, algorithm execution advances to step 124 where the control circuit 42 is operable to update the particulate load accumulator based on regeneration of the particulate filter 40 that is underway resulting from execution of step 122.

In one embodiment, the control circuit 42 is operable at step 124 to monitor the oxidation rate of the particulate filter 40 as a conventional function of the time during which the particulate filter is being actively generated and of the particulate load of the particulate filter 40 at the start of active regeneration thereof. The memory unit 45 may, for example, have a two-dimensional particulate oxidation rate table stored therein having one table axis defined by discrete values of particulate load at the start of active regeneration and another table axis defined by discrete values of regeneration time, and which is populated by incremental particulate load values each corresponding to incremental amounts that the particulate load of the particulate filter 40 is reduced resulting from oxidation thereof during active regeneration of the particulate filter 40. In this embodiment, the control circuit 42 is operable at step 124 to map the starting particulate load and regeneration time values to a corresponding incremental particulate load value using the particulate oxidation rate table just described. The control circuit 42 is then operable to update the particulate load accumulator by subtracting the incremental particulate load value from the current particulate load value of the particulate load accumulator. Those skilled in the art will recognize other conventional structures and/or techniques for monitoring and tracking the reduction of particulate or soot load of the particulate filter 40 during active regeneration thereof, and such other conventional structures and/or techniques are contemplated by this disclosure.

Following step 124, the control circuit 42 is operable at step 126 to determine whether the current particulate load of the particulate filter 40 is less than or equal to a particulate load threshold value, $PL_{TH2}$, wherein $PL_{TH2} < PL_{TH1}$. Generally, $PL_{TH2}$ corresponds to a level or amount of particulate load in the particulate filter 40 at which the particulate filter 40 is acceptably clean such that active regeneration of the particulate filter 40 can be terminated. If, at step 126, the control circuit 42 determines that the particulate load is greater than $PL_{TH2}$, execution of the algorithm 100 loops back to step 124. If, at step 126, the control circuit 42 instead determines that the particulate load is less than or equal to $PL_{TH2}$, algorithm execution advances to step 128 where the control circuit 42 terminates active regeneration of the particulate filter 40. Algorithm execution loops from step 128 back to step 110.

If, at step 122, the control circuit 42 determines that the SOx load of the NAC 38 that was determined at step 110 exceeds the SOx load threshold $SOXL_{TH1}$, algorithm execution advance to step 130 where the control circuit is operable to terminate active regeneration of the particulate filter 40. Thereafter at step 132, the control circuit is operable to update the particulate load based on the duration of active regeneration of the particulate filter 40, as described hereinabove with respect to step 124. Following step 132, the control circuit 42 is operable at step 134 to initiate active SOx regeneration of the NAC 38 in a conventional manner as described hereinabove. Thereafter at step 136, the control circuit 42 is operable to determine whether the vehicle road speed has dropped below a second vehicle speed threshold value, $VS_{TH2}$, wherein $VS_{TH2} < VS_{TH1}$. Typically, $VS_{TH2}$ will be set at some vehicle road speed value that provides a desirable amount of hysteresis between $VS_{TH1}$ and $VS_{TH2}$. In embodiments in which $VS_{TH1}$ is approximately 35 miles per hour, $VS_{TH2}$ may, for example, be 20 miles per hour. Other values of $VS_{TH1}$ and/or $VS_{TH2}$ are, however, contemplated by this disclosure. In any case, if the control circuit 42 determines at step 136 that the vehicle road speed, VS, is greater than $VS_{TH2}$, algorithm execution advances to step 138.

In one embodiment, the control circuit 42 is operable at step 138 to monitor the oxidation rate of SOx from the NAC 38 as a conventional function of the time during which active SOx regeneration of the NAC 38 is being conducted and of the SOx load of the NAC 38 at the start of active regeneration thereof. The memory unit 45 may, for example, have a two-dimensional SOx oxidation rate table stored therein having one table axis defined by discrete values of SOx load at the start of active SOx regeneration of the NAC 38 and another table axis defined by discrete values of regeneration time, and which is populated by incremental SOx load values each corresponding to incremental amounts that the SOx load of the NAC 38 is reduced resulting from oxidation thereof during active SOx regeneration of the NAC 38. In this embodiment, the control circuit 42 is operable at step 138 to map the starting SOx load and regeneration time values to a corresponding incremental SOx load value using the SOx oxidation rate table just described. The control circuit 42 is then operable to update the SOx load accumulator by subtracting the incremental SOx load value from the current SOx load value of the Sox load accumulator. Those skilled in the art will recognize other conventional structures and/or techniques for monitoring and tracking the reduction of SOx in the NAC 38 during active SOx regeneration thereof, and such other conventional structures and/or techniques are contemplated by this disclosure.

Following step 138, the control circuit 42 is operable at step 140 to determine whether the current SOx load of the NAC 38 is less than or equal to a SOx load threshold value, $SOXL_{TH2}$, wherein $SOXL_{TH2} < SOXL_{TH1}$. Generally, $SOXL_{TH2}$ corresponds to a level or amount of SOX in the NAC 38 at which the NAC 38 is considered to be acceptably clean such that active SOX regeneration of the NAC 38 can be terminated. If, at step 140, the control circuit 42 determines that the SOx load is greater than $SOXL_{TH2}$, execution of the algorithm 100 loops back to step 136. If, at step 140, the control circuit 42 instead determines that the SOx load is less than or equal to $SOXL_{TH2}$, algorithm execution advances to step 142 where the control circuit 42 terminates active SOx regeneration of the NAC 38. Algorithm execution loops from step 142 back to step 110.

If, at step 136, the control circuit 42 determines that vehicle road speed, VS, is at or below $VS_{TH2}$, algorithm execution advances to step 144 where the control circuit 42 is operable to terminate active SOx regeneration of the NAC 38. Thereafter at step 146, the control circuit 42 is operable to update the SOx load based on the duration of active SOx regeneration of the NAC 38, as described hereinabove with respect to step 138. Execution of the algorithm 100 loops from step 146 back to step 110.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A method of controlling regeneration of exhaust gas aftertreatment components coupled to an exhaust manifold of an internal combustion engine, the method comprising:
   monitoring a particulate load of a particulate filter comprising one of the exhaust gas aftertreatment components,
   monitoring a sulfur oxide (SOx) load of a NOx catalyst comprising another of the exhaust gas aftertreatment components,
   determining a vehicle speed corresponding to a road speed of a vehicle carrying the engine and the exhaust gas aftertreatment components,
   initiating regeneration of the particulate filter if the particulate load is greater than a first particulate load threshold and the road speed is greater than a first speed threshold, and
   terminating regeneration of the particulate filter and initiating SOx regeneration of the NOx catalyst if the particulate filter is being regenerated and the SOx load is greater than a first SOx load threshold.

2. A method of regenerating a particulate filter and a NOx catalyst that are fluidly coupled to an exhaust manifold of an internal combustion engine, comprising:

monitoring a particulate load of the particulate filter, monitoring a sulfur oxide (SOx) load of the NOx catalyst, determining a road speed of a vehicle carrying the engine, the particulate filer and the NOx catalyst, initiating regeneration of the particulate filter if the particulate load is greater than a first particulate load threshold and the road speed is greater than a road speed threshold, and terminating regeneration of the particulate filter and initiating SOx regeneration of the NOx catalyst it the particulate filter is being regenerated and the SOx load is greater than a first SOx load threshold.

3. The method of claim 2 wherein initiating regeneration of the particulate filter comprises controlling delivery of fuel to the engine so that unburned fuel is selectively introduced into exhaust gas produced by the engine, whereby the unburned fuel in the exhaust gas reacts with an oxidation catalyst positioned between the exhaust manifold and the particulate filter to elevate the temperature of exhaust gas passing through the particulate filter to a temperature suitable for oxidizing particulate matter collected in the particulate filter.

4. The method of claim 2 wherein initiating SOx regeneration of the NOx catalyst comprises controlling delivery of fuel to the engine so that unburned fuel is selectively introduced into exhaust gas produced by the engine, whereby the unburned fuel in the exhaust gas reacts with an oxidation catalyst positioned between the exhaust manifold and the NOx catalyst to elevate the temperature of exhaust gas passing through the NOx catalyst to a temperature suitable for oxidizing SOx collected in the NOx catalyst.

5. A system for controlling regeneration of exhaust gas aftertreatment components fluidly coupled to an exhaust manifold of an internal combustion engine, comprising:

a particulate filter defining one of the exhaust gas aftertreatment components, a NOx catalyst defining another of the exhaust gas aftertreatment components, a vehicle speed sensor producing a vehicle speed signal indicative of road speed of a vehicle carrying the engine and the exhaust gas treatment components, and a control circuit including a memory unit having stored therein instructions that are executable by the control circuit to monitor a particulate load of the particulate filter and initiate regeneration of the particulate filter if the particulate load is greater than a first load threshold and the vehicle speed signal indicates that the road speed of the vehicle is greater than a first speed threshold, and to monitor a sulfur oxide (SOx) load of the NOx catalyst and initiate SOx regeneration of the NOx catalyst if the particulate filter is being regenerated and the SOx load is greater than a first SOx load threshold.

6. The system of claim 1 wherein the instructions further comprise instructions that are executable by the control circuit to initiate regeneration of the particulate filter regardless of the road speed of the vehicle if the particulate load is greater than a regeneration threshold, and wherein the regeneration threshold is greater than the first load threshold.

7. The system of claim 5 wherein the NOx catalyst is positioned between the exhaust manifold of the engine and the particulate filter.

8. The system of claim 5 wherein the instructions further comprise instructions that are executed by the control circuit to command regeneration of the particulate filter while the particulate load is above a second load threshold that is less than the first particulate load threshold if the SOx load is less than the first SOx load threshold.

9. The system of claim 8 wherein the instructions further comprise instructions that are executed by the control circuit to terminate regeneration of the particulate filter if the particulate load drops below the second load threshold.

10. The system of claim 5 further comprising an oxidation catalyst positioned between the exhaust manifold of the engine and the particulate filter and NOx catalyst.

11. The system of claim 10 wherein the control circuit is configured to control regeneration of the particulate filter by controlling delivery of fuel from the fuel system to the engine so that unburned fuel is introduced into exhaust gas produced by the engine, whereby the unburned fuel in the exhaust gas reacts with the oxidation catalyst to elevate the temperature of exhaust gas passing through the particulate filter to a temperature suitable for oxidizing particulate matter collected in the particulate filter.

12. The system of claim 10 wherein the control circuit is configured to control SOx regeneration of the NOx catalyst by controlling delivery of fuel from the fuel system to the engine so that unburned fuel is introduced into exhaust gas produced by the engine, whereby the unburned fuel in the exhaust gas reacts with the oxidation catalyst to elevate the temperature of exhaust gas passing through the NOx catalyst to a temperature suitable for oxidizing SOx collected in the NOx catalyst.

13. The system of claim 1 further comprising a fuel system responsive to a fueling signal to supply fuel to the engine, wherein the instructions further comprise instructions that are executable by the control circuit to determine the SOx load of the NOx catalyst based on the fueling signal.

14. The system of claim 13 wherein the instructions further comprise instructions that are executable by the control circuit to determine instantaneous values of the SOx load of the NOx catalyst as a function of corresponding instantaneous values of the fueling signal while the NOx catalyst is not undergoing SOx regeneration, and to determine the SOx load by accumulating the instantaneous values of the SOx load over time.

15. The system of claim 14 further comprising an oxidation rate function stored in the memory unit, the oxidation rate function defining a rate of oxidation of SOx in the NOx catalyst as a function of time, and wherein the instructions further comprise instructions that are executable by the control circuit to reduce the SOx load based on the oxidation rate function over a period of time during which the NOx catalyst is undergoing SOx regeneration.

16. The system of claim 1 further comprising an engine speed sensor producing an engine speed signal indicative of rotational speed of the engine, wherein the instructions further comprise instructions that are executable by the control circuit to determine the particulate load based on the engine speed signal.

17. The system of claim 16 further comprising a fuel system responsive to a fueling signal to supply fuel to the engine, wherein the instructions further comprise instructions that are executable by the control circuit to determine the particulate load further based on the fueling signal.

18. The system of claim 17 wherein the instructions further comprise instructions that are executable by the control circuit to determine instantaneous values of the particulate load as a function of corresponding instantaneous values of the engine speed signal and the fueling signal while the particulate filter is not being regenerated, and to determine the particulate load by accumulating the instantaneous values of the particulate load over time.

19. The system of claim 18 further comprising an oxidation rate function stored in the memory unit, the oxidation rate function defining a rate of oxidation of particulates in the particulate filter as a function of time, and wherein the instructions further comprise instructions that are executable by the control circuit to reduce the particulate load based on the oxidation rate function over a period of time during which the particulate filter is being regenerated.

20. The system of claim 5 wherein the instructions further comprise instructions that are executed by the control circuit to terminate regeneration of the particulate filter prior to initiating SOx regeneration of the NOx catalyst.

21. The system of claim 20 wherein the instructions further comprise instructions that are executed by the control circuit to command SOx regeneration of the NOx catalyst while the vehicle speed signal indicates that the road speed of the vehicle is above a second speed threshold that is less than the first speed threshold.

22. The system of claim 21 wherein the instructions further comprise instructions that are executed by the control circuit to terminate SOx regeneration of the NOx catalyst if the SOx load drops below a second SOx load threshold that is less than the first SOx load threshold.

23. The system of claim 21 wherein the instructions further comprise instructions that are executed by the control circuit to terminate SOx regeneration of the NOx catalyst if the road speed of the vehicle drops below the second speed threshold.

* * * * *

UNITED STATES PATENT AND TRADEMARK OFFICE
CERTIFICATE OF CORRECTION

PATENT NO. : 7,543,446 B2  Page 1 of 1
APPLICATION NO. : 11/957872
DATED : June 9, 2009
INVENTOR(S) : Ruth et al.

It is certified that error appears in the above-identified patent and that said Letters Patent is hereby corrected as shown below:

Column 13, line 54, "claim 1" should read --claim 5--.

Column 14, line 28, "claim 1" should read --claim 5--.

Column 14, line 52, "claim 1" should read --claim 5--.

Signed and Sealed this

Twenty-fourth Day of November, 2009

David J. Kappos
*Director of the United States Patent and Trademark Office*